United States Patent
Aoki

(10) Patent No.: US 9,584,049 B2
(45) Date of Patent: Feb. 28, 2017

(54) MOTOR DRIVING CONTROL METHOD AND MOTOR DRIVING CONTROL DEVICE

(71) Applicant: MINEBEA CO., LTD., Kitasaku-Gun, Nagano (JP)

(72) Inventor: Masato Aoki, Iwata (JP)

(73) Assignee: Minebea Co., Ltd., Nagano (JP)

( * ) Notice: Subject to any disclaimer, the term of this patent is extended or adjusted under 35 U.S.C. 154(b) by 95 days.

(21) Appl. No.: 14/719,716

(22) Filed: May 22, 2015

(65) Prior Publication Data

US 2015/0349678 A1 Dec. 3, 2015

(30) Foreign Application Priority Data

May 27, 2014 (JP) .................. 2014-109211

(51) Int. Cl.
  *H02P 6/08* (2016.01)
  *H02P 6/14* (2016.01)

(52) U.S. Cl.
  CPC . *H02P 6/14* (2013.01); *H02P 6/26* (2016.02)

(58) Field of Classification Search
  CPC .................. H02P 6/008; H02P 6/14
  USPC ...... 318/291, 293, 375, 376, 400.26, 400.29
  See application file for complete search history.

(56) References Cited

U.S. PATENT DOCUMENTS

| 7,786,688 B2* | 8/2010 | Hayashi | ............... H02P 7/29 318/400.26 |
| 2008/0252239 A1* | 10/2008 | Lin | ............... H02P 6/08 318/400.06 |
| 2011/0089878 A1* | 4/2011 | Mishima | ............... H02P 29/032 318/447 |

FOREIGN PATENT DOCUMENTS

JP  2009296850 A  12/2009

* cited by examiner

*Primary Examiner* — Bentsu Ro
(74) *Attorney, Agent, or Firm* — Carrier Blackman & Associates, P.C.; Joseph P. Carrier; William D. Blackman

(57) ABSTRACT

An H-bridge circuit controls a motor and includes a first series circuit of switching elements and a second series circuit of switching elements connected in parallel to the first series circuit. A motor driving control method includes a step of turning each of the switching elements Q2, Q3 off and turning-on or performing PWM control on the switching element Q1 and also turning the switching elements Q4 on; a step of performing PWM control on Q1; a step of turning off Q1; a step of repeating for a predetermined number of times a first kickback suppression period during which Q2 is turned on and Q4 is turned off and a second kickback suppression period during which Q2 is turned off and Q4 is turned on; and a step of turning Q2 on and turning on or performing PWM control on Q3.

11 Claims, 12 Drawing Sheets

| | FIRST EN-ERGIZATION CONTROL PERIOD | PWM CONTROL PERIOD | REGEN-ERATION CONTROL PERIOD | KICKBACK SUPPRES-SION PERIOD | SHORT-CIRCUIT PREVENTION CONTROL PERIOD | | SECOND ENERGIZA-TION CONTROL PERIOD |
|---|---|---|---|---|---|---|---|
| | 1 | 2 | | 3 | 4 | 5 | 6 |
| Q1 | PWM | OFF | ON | OFF | OFF | OFF | OFF | OFF |
| Q2 | OFF | OFF | OFF | OFF | ON | OFF | ON | ON |
| Q3 | OFF | OFF | OFF | OFF | OFF | OFF | OFF | PWM |
| Q4 | ON | ON | ON | ON | OFF | ON | OFF | OFF |

FIG. 2

|    | FIRST EN-ERGIZATION CONTROL PERIOD | PWM CONTROL PERIOD | | REGEN-ERATION CONTROL PERIOD | KICKBACK SUPPRES-SION PERIOD | | SHORT-CIRCUIT PREVENTION CONTROL PERIOD | SECOND ENERGIZA-TION CONTROL PERIOD |
|----|---|---|---|---|---|---|---|---|
|    | 1 | 2 | | 3 | 4 | | 5 | 6 |
| Q1 | PWM | OFF | ON | OFF | OFF | OFF | OFF | OFF |
| Q2 | OFF | OFF | OFF | OFF | ON | OFF | ON | ON |
| Q3 | OFF | OFF | OFF | OFF | OFF | OFF | OFF | PWM |
| Q4 | ON | ON | ON | ON | OFF | ON | OFF | OFF |

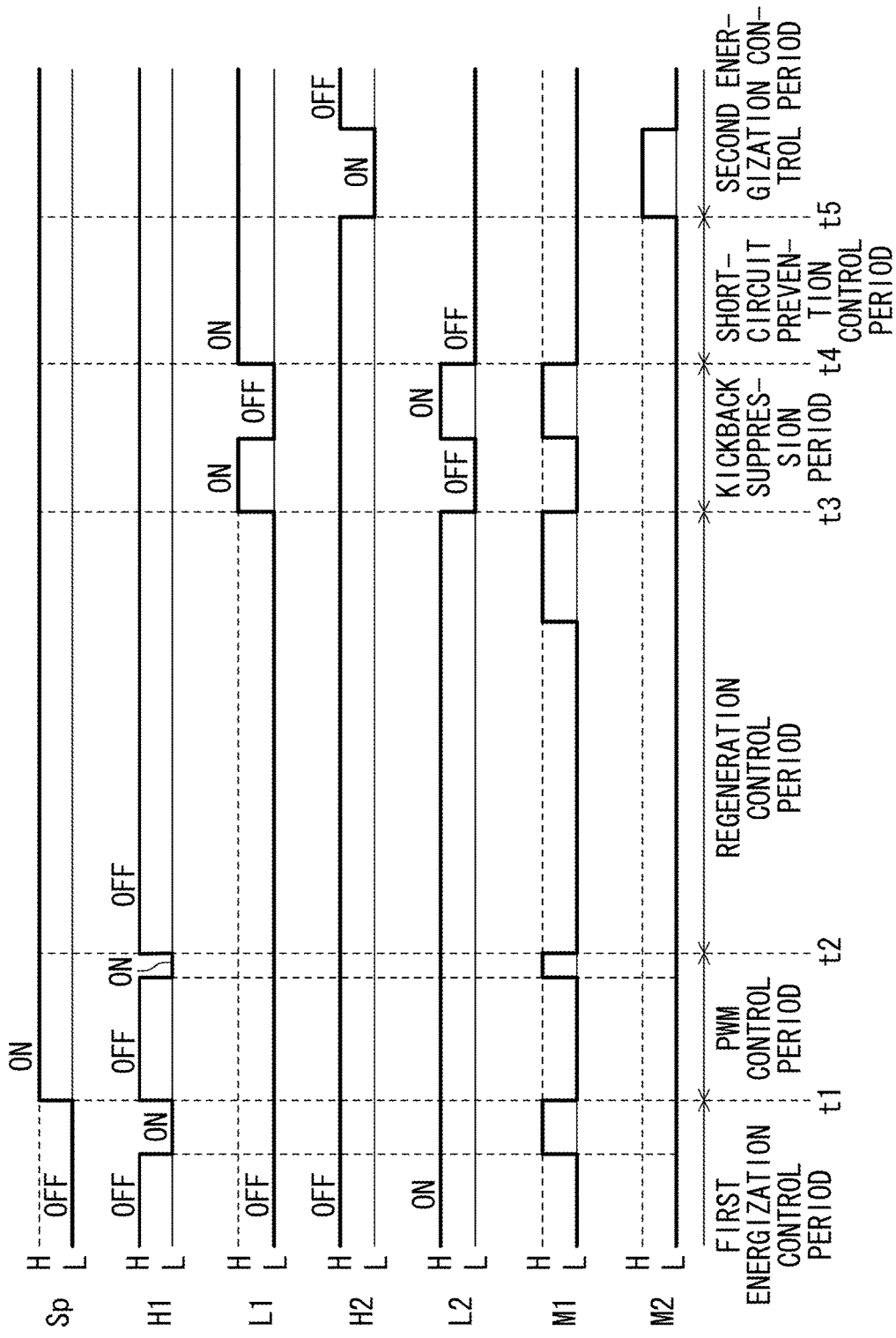

FIG. 11

|    | FIRST ENERGIZATION CONTROL PERIOD | PWM CONTROL PERIOD | | ALL-PHASE OFF CONTROL PERIOD | SECOND ENERGIZATION CONTROL PERIOD |
|----|---|---|---|---|---|
|    | 1 | 2 | | 3 | 4 |
| Q1 | PWM | OFF | ON | OFF | OFF |
| Q2 | OFF | OFF | OFF | OFF | ON |
| Q3 | OFF | OFF | OFF | OFF | PWM |
| Q4 | ON | ON | ON | OFF | OFF |

MOTOR DRIVING CONTROL METHOD AND MOTOR DRIVING CONTROL DEVICE

BACKGROUND OF THE INVENTION

1. Field of the Invention

The present invention relates to a motor driving control method and a motor driving control device in each of which current flows through the coil of a motor to thereby drive the motor.

2. Description of the Related Art

A driving control method of a single-phase motor will be explained below.

A description of a configuration of a motor driving control device 101 of a comparative example will be provided with reference to FIG. 10.

The motor driving control device 101 controls the driving of a motor 20 as a single-phase brushless motor. The motor 20 includes a position detector 30 as a Hall element, for example, and a motor coil Lm. The motor driving control device 101 includes a control circuit 104, a pre-drive circuit 103 and an H-bridge circuit 102.

The control circuit 104 generates a drive control signal Sd based on a position detection signal (positional information) Sp from the position detector 30 and outputs the drive control signal Sd to the pre-drive circuit 103.

The pre-drive circuit 103 generates drive signals H1, H2, L1 and L2 based on the drive control signal Sd. The drive signals H1, H2, L1 and L2 thus generated are output to the H-bridge circuit 102.

The H-bridge circuit 102 includes a first series circuit having first and second switching elements Q1, Q2 connected between a DC power source Vdd and the ground, and a second series circuit having a third and fourth switching elements Q3, Q4 connected in parallel to the first series circuit.

Each of the first and third switching elements Q1 and Q3 is a P-type MOSFET (metal-oxide-semiconductor field-effect transistor). Each of the second and fourth switching elements Q2 and Q4 is an N-type MOSFET. The motor coil Lm of the motor 20 is connected between a connection node of the first switching element Q1 and the second switching element Q2 and a connection node of the third switching element Q3 and the fourth switching element Q4.

The motor driving control device 101 turns on/off the first and fourth switching elements Q1, Q4 and the second and third switching elements Q2, Q3 in a complementary manner to thereby change the direction of a coil current IL flowing through the motor coil Lm. The motor is driven in this manner. A comparative example of the operation of the switching elements during respective energization control periods is shown FIG. 11.

In this case, as a concrete example, the operation states of the first and fourth switching elements Q1 to Q4 according to the energization control of the motor driving control device 101.

During a first energization control period (first period), the first switching element Q1 is subjected to PWM (Pulse Width Modulation) control. Each of the second and third switching elements Q2, Q3 is turned off. The fourth switching element Q4 is turned on. Incidentally, the first switching element Q1 may not be subjected to PWM control but may be controlled so as to be in an on state.

During a PWM control period (second period), the first switching element Q1 is subjected to PWM control with a predetermined on-duty. In this case, a PWM pulse of one period is output based on turning-on and turning-off of this switching element. Each of the second and third switching elements Q2, Q3 is turned off like the first energization control period. The fourth switching element Q4 is turned on like the first energization control period.

During an all-phase off control period (third period), each of the first and fourth switching elements Q1 to Q4 is turned off.

During a second energization control period (fourth period), the third switching element Q3 is subjected to PWM control. The second switching element Q2 is turned on. Each of the first and fourth switching elements Q1, Q4 is turned off. Incidentally, the third switching element Q3 may not be subjected to PWM control but may be controlled so as to be in an on-state.

An example of the change of the coil current in the comparative example is shown in FIG. 12. The change of the coil current IL flowing through the motor coil in the control method is described with a graph, having an vertical axis that represents a current value and an horizontal axis that represents the time.

During the first energization control period, the coil current maintains a current value.

As time progresses during the PWM control period from a first time point t11 to a second time point t12, the coil current IL current value Ib of the second time point is reduced compared to that from the current value Ia of the previous first time point.

During the all-phase off control period from the second time point t12 to a third time point t13, the coil current IL reduces abruptly and becomes 0 A.

During the second energization control period on and after the third time point t13, the coil current IL gradually reduces and reaches a negative current value (−Ia) and thereafter maintains this negative current value (−Ia).

In this manner, according to the control method of the comparative example, since the all-phase off control period is provided at the time of switching the energization, the direction of flow of the coil current IL flowing through the motor coil Lm changes abruptly while accumulating a lot of energy in the motor coil Lm. Thus, a large regenerative current flows through a power source line and hence a serious inductive kickback occurs. As a result, a problem arises wherein the vibration of the single-phase motor and noise become large.

In view of such a problem, there is disclosed a motor control method for suppressing the inductive kickback. JP-A-2009-296850 describes a method for controlling a motor by controlling a motor coil bridged between a first transistor to a fourth transistor includes: a first energization control step of flowing current from the first transistor to the fourth transistor side through the motor coil; a first PWM control step of performing PWM control on the first transistor; a regenerative control step of generating regenerative current so as to flow from the third transistor to the fourth transistor side through the motor coil; a non-overlap control step of flowing current from the third transistor to the fourth transistor side though the motor coil; a second PWM control step of executing PWM control on the second transistor; and a second energization control step of stopping the PWM control on the second transistor and flowing current from the second transistor to the third transistor side through the motor coil.

The motor control method described in JP-A-2009-296850 has the following problem. That is, in a case that an amount of energy to be regenerated is relatively small, energy accumulated in the motor coil can be entirely released by the regenerative control step and the non-overlap control step etc. However, in a case that an amount of energy to be regenerated is relatively large, energy accumulated in the motor coil can not be effectively released even by using these control steps. Thus, the motor may vibrate and noise may be generated due to the inductive kickback.

SUMMARY

The present invention has been made in view of the above circumstances, and one of the objects of the present invention is to provide a motor driving control method and a motor driving control device, each of which can effectively release energy accumulated in a motor coil at a time of energization switching for changing the direction of flow of coil current of a motor and can suppress the vibration of the motor and noise by suppressing the occurrence of inductive kickback.

According to an illustrative embodiment of the present invention, there is provided a motor driving control method for controlling rotation of a motor by controlling an H-bridge circuit. The H-bridge circuit has: a first series circuit that includes first and second switching elements that are connected between a DC power source and a ground; a second series circuit that includes third and fourth switching elements, the second series circuit being connected in parallel to the first series circuit; and a motor coil of the motor which is connected between a connection node of the first switching element and the second switching element and a connection node of the third switching element and the fourth switching element. The method includes first to fifth steps. In a first step, during a first energization control period, each of the second and third switching elements are turned off, the first switching element is turned on or applied with PWM control, and the fourth switching element is turned on. In a second step, during a PWM control period after the first energization control period, the first switching element is applied with PWM control with a predetermined on-duty for a predetermined number of times. In a third step, during a regeneration control period after the PWM control period, the first switching element is turned off. In a fourth step, during a kickback suppression period after the regeneration control period, a first kickback suppression period and a second kickback suppression period are repeated for a predetermined number of times, wherein the second switching element being turned on and the fourth switching element being turned off during the first kickback suppression period, and wherein the second switching element being turned off and the fourth switching element being turned on during the second kickback suppression period. In a fifth step, during a second energization control period after the kickback suppression period, the second switching element is turned on and the third switching element is turned on or applied with PWM control.

According to another illustrative embodiment of the present invention, there is provided a motor driving control device including an H-bridge circuit including: a first series circuit that includes first and second switching elements that are connected between a DC power source and a ground; a second series circuit that includes third and fourth switching elements, the second series circuit being connected in parallel to the first series circuit; and a motor coil of the motor which is connected between a connection node of the first switching element and the second switching element and a connection node of the third switching element and the fourth switching element. The apparatus further includes: a pre-drive circuit that generates drive signals for driving the first, second, third and fourth switching elements of the H-bridge circuit; and a control circuit that generates a drive control signal for controlling the drive signals output from the pre-drive circuit. The control circuit includes an energization pattern generation part that is configured to: generate a first energization control pattern for turning off each of the second and third switching elements, turning on or performing PWM control on the first switching element, and turning on the fourth switching element; generate, after generating the first energization control pattern, a PWM control pattern for performing PWM control on the first switching element with a predetermined on-duty for a predetermined number of times; generate, after generating the PWM control pattern, a regeneration control pattern for turning off the first switching element; generate, after generating the regeneration control pattern, a kickback suppression pattern that includes a first kickback suppression pattern for turning on the second switching element and turning off the fourth switching element, a second kickback suppression pattern for turning off the second switching element and turning on the fourth switching element, and information indicating a number of times to repeat the first kickback suppression pattern and the second kickback suppression pattern; and generate, after generating the kickback suppression pattern, a second energization control pattern for turning on the second switching element and turning on or performing PWM control on the third switching element. The control circuit also includes a motor control part that is configured to generate the drive control signal based on the respective energization patterns generated by the energization pattern generation part and positional information of the motor.

According to still another illustrative embodiment of the present invention, there is provided a motor driving control method for controlling rotation of a motor by controlling an H-bridge circuit having: a first series circuit that includes first and second switching elements that are connected between a DC power source and a ground; a second series circuit that includes third and fourth switching elements, the second series circuit being connected in parallel to the first series circuit; and a motor coil of the motor which is connected between a connection node of the first switching element and the second switching element and a connection node of the third switching element and the fourth switching element. The method includes: turning off each of the second and third switching elements, turning on or performing PWM control on the first switching element, and turning on the fourth switching element during a first energization control period; performing PWM control on the first switching element with a predetermined on-duty for a predetermined number of times during a PWM control period after the first energization control period; turning off the first switching element during a regeneration control period after the PWM control period; repeating for a predetermined number of times a first kickback suppression step and a second kickback suppression step during a kickback suppression period after the regeneration control period, the second switching element being turned on and the fourth switching element being turned off in the first kickback suppression step, and the second switching element being turned off and the fourth switching element being turned on in the second kickback suppression step; and turning on the second switching element and turning on or performing PWM control on the third switching element during a second energization control period after the kickback suppression period.

BRIEF DESCRIPTION OF THE DRAWINGS

In the accompanying drawings:

FIG. 2 is a diagram showing the operations of switching elements during respective energization control periods in the embodiment;

FIG. 7 is a diagram showing waveforms of respective drive signals and waveforms of output signals in the embodiment;

FIG. 11 is a diagram showing the operations of switching elements during respective energization control periods in the comparative example.

DETAILED DESCRIPTION

Hereinafter, an embodiment of the invention will be explained in detail with reference to the drawings.

Figure 1:
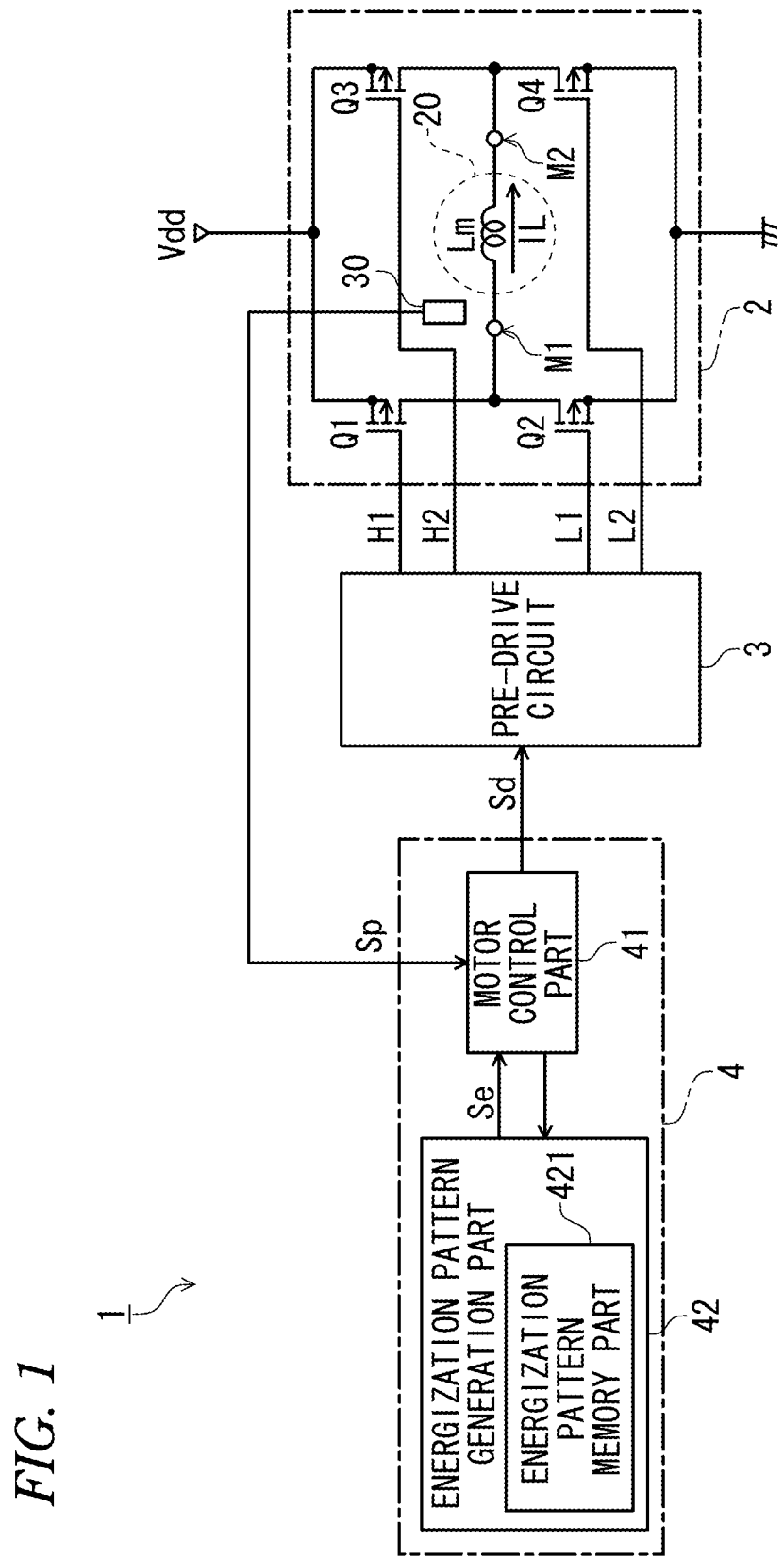
FIG. 1 is a schematic diagram showing the configuration of a motor driving control device according to an embodiment.

FIG. 1 is a schematic diagram showing the configuration of a motor driving control device 1 according to the embodiment.

As shown in FIG. 1, the motor driving control device 1 controls the driving of a motor 20 as a single-phase brushless motor. The motor 20 includes a position detector 30 as a Hall element, for example, and a motor coil Lm. The motor driving control device 1 includes a control circuit 4, a pre-drive circuit 3 and an H-bridge circuit 2.

The control circuit 4 includes a motor control part 41 and an energization pattern generation part 42. The control circuit 4 generates a drive control signal Sd based on a position detection signal Sp (positional information) from the position detector 30 and outputs the drive control signal to the pre-drive circuit 3.

The energization pattern generation part 42 includes an energization pattern memory part 421. The energization pattern generation part 42 generates energization pattern information Se of respective energization control periods. The energization pattern memory part 421 stores in memory the energization pattern information Se. The invention is not limited thereto and the energization pattern generation part 42 may generate the energization pattern information Se by such a method of reading the energization pattern from an external storage device etc. each time as the occasion arises. Thus, the energization pattern memory part 421 is not an indispensable constituent element for the motor driving control device 1.

The motor control part 41 generates the drive control signal Sd based on the position detection signal Sp as the positional information of the motor 20 and the energization pattern information Se.

The pre-drive circuit 3 generates drive signals H1, H2, L1 and L2 based on the drive control signal Sd. The drive signals H1, H2, L1 and L2 thus generated are output to the H-bridge circuit 2.

The H-bridge circuit 2 includes a first series circuit which has switching elements Q1, Q2 connected between a DC power source Vdd and the ground and a second series circuit which has switching elements Q3, Q4 and is connected in parallel to the first series circuit.

The switching element Q1 (first switching element) is a P-type MOSFET which source (one end) is connected to the DC power source Vdd and drain (the other end) is connected to the switching element Q2 (second switching element). The switching element Q2 is an N-type MOSFET. The drain (one end) of the switching element Q2 is connected to the drain (the other end) of the switching element Q1 and the source (the other end) of the switching element Q2 is connected to the ground. The second series circuit having the switching element Q3 (third switching element) and the switching element Q4 (fourth switching element) is configured in the similar manner as the first series circuit having the switching elements Q1 and Q2. Each of the switching elements Q1 to Q4 is not limited to the MOSFET and may be a semiconductor switching element of other type.

The first end of the motor coil Lm of the motor 20 is connected to a connection node between the switching element Q1 and the switching element Q2 and outputs an output signal M1. The second end of the motor coil Lm is connected to a connection node between the switching element Q3 and the switching element Q4 and outputs an output signal M2.

FIG. 2 is a diagram showing the operations of the switching elements during respective energization control periods of this embodiment. In this case, this figure shows the operation states of the switching elements Q1 to Q4 at the time of transition from a first energization control period to a second energization control period according to the energization control of the motor driving control device 1.

During the first energization control period (first period), the switching element Q1 is subjected to PWM control. Each of the switching elements Q2, Q3 is turned off. The switching element Q4 is turned on. Hereinafter, this energization pattern is referred to as a first energization control pattern.

During a PWM control period (second period), the switching element Q1 is only once subjected to PWM control with a predetermined on-duty. Each of the switching elements Q2, Q3 is turned off like the first energization control period. The switching element Q4 is turned on like the first energization control period. Hereinafter, this energization pattern is referred to as a PWM control energization pattern. In this respect, only a single PWM pulse is generated based on turning-on and turning-off of the switching element Q1.

During a regeneration control period (third period), the switching element Q1 is turned off. Each of the switching elements Q2, Q3 is turned off like the PWM control period. The switching element Q4 is turned on like the PWM control period.

Hereinafter, this energization pattern is referred to as a regeneration control energization pattern.

A kickback suppression period (fourth period) is a combination of a first kickback suppression period and a second kickback suppression period. In the first kickback suppression period, the switching element Q1 is turned off. The switching element Q2 is turned on. The switching element Q3 is turned off like the regeneration control period. The switching element Q4 is turned off. Hereinafter, this energization pattern is referred to as a first kickback suppression energization pattern.

During the second kickback suppression period, the switching element Q1 is turned off like the first kickback suppression period. The switching element Q2 is turned off. The switching element Q3 is turned off like the first kickback suppression period. The switching element Q4 is turned on. Hereinafter, this energization pattern is referred to as a second kickback suppression energization pattern. The second kickback suppression energization pattern is the same as the regeneration control energization pattern.

During a short-circuit prevention control period (fifth period), the switching element Q1 is turned off like the second kickback suppression period. The switching element Q2 is turned on. The switching element Q3 is turned off like the second kickback suppression period. The switching element Q4 is turned off. Hereinafter, this energization pattern is referred to as a short-circuit prevention control energization pattern. The short-circuit prevention control energization pattern is the first kickback suppression energization pattern.

During a second energization control period (sixth period), the switching element Q1 is turned off like the short-circuit prevention control period. The switching element Q2 is turned on like the short-circuit prevention control period. The switching element Q3 is subjected to PWM control. The switching element Q4 is turned off. Hereinafter, this energization pattern is referred to as a second energization control pattern.

The operations during the respective control periods in a case of transition from the second energization control period to the first energization control period are the same as the operations during the aforesaid respective control periods except for that the operations of the switching element Q1 and the operations of the switching element Q3 are exchanged and the operations of the switching element Q2 and the operations of the switching element Q4 are exchanged.

The energization pattern generation part 42 (see FIG. 1) generates the first energization control pattern, the PWM control energization pattern, the regeneration control energization pattern, the first and second kickback suppression energization patterns, the short-circuit prevention control energization pattern and the second energization control pattern.

The energization pattern memory part 421 (see FIG. 1) stores information of the first energization control pattern, information of the PWM control energization pattern, information of the regeneration control energization pattern, information of the first and second kickback suppression energization patterns, information of the short-circuit prevention control energization pattern and information of the second energization control pattern.

Figure 3A:
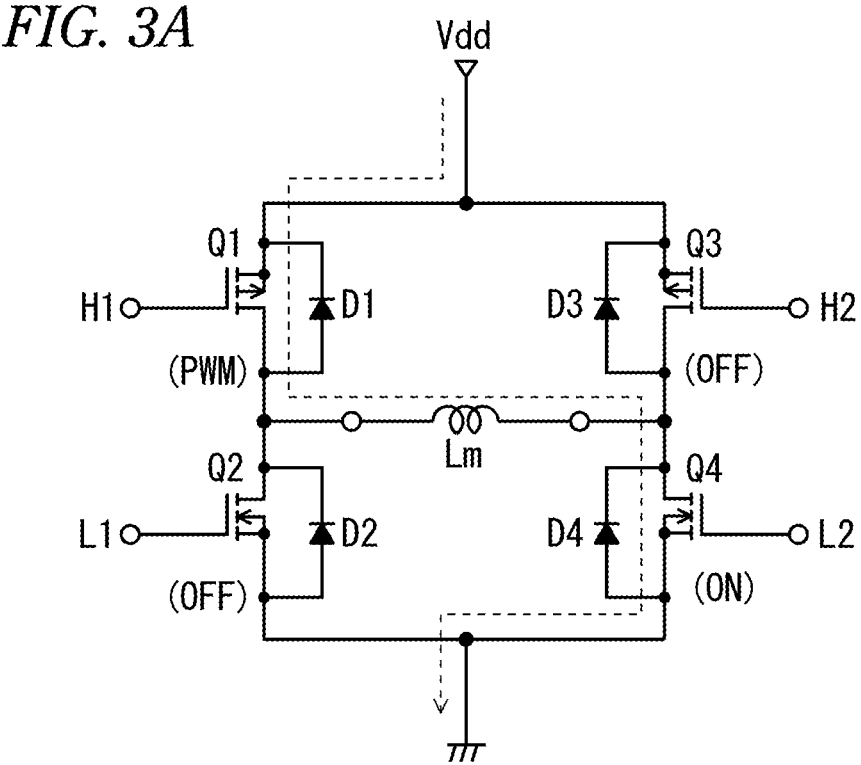
FIGS. 3A-B are diagrams showing current paths during a first energization control period and a PWM control period.

FIGS. 3A and B are diagrams showing the current paths during the first energization control period and the PWM control period, respectively.

FIG. 3A is the diagram showing the current path during the first energization control period (see FIG. 2).

The switching elements Q1 to Q4 are provided with parasitic diodes D1 to D4, respectively. The parasitic diodes D1 to D4 are connected in parallel to the switching elements Q1 to Q4, respectively.

In the first energization control period, the switching element Q1 is subjected to PWM control. The switching element Q4 is turned on. Each of the switching elements Q2, Q3 is turned off.

Current shown by a dotted line flows from the DC power source Vdd to the ground via the switching element Q1, the motor coil Lm and the switching element Q4. In this case, the coil current IL maintains the current value Ia. Incidentally, the switching element Q1 may not be subjected to PWM control but may be placed in an on state.

Figure 3B:
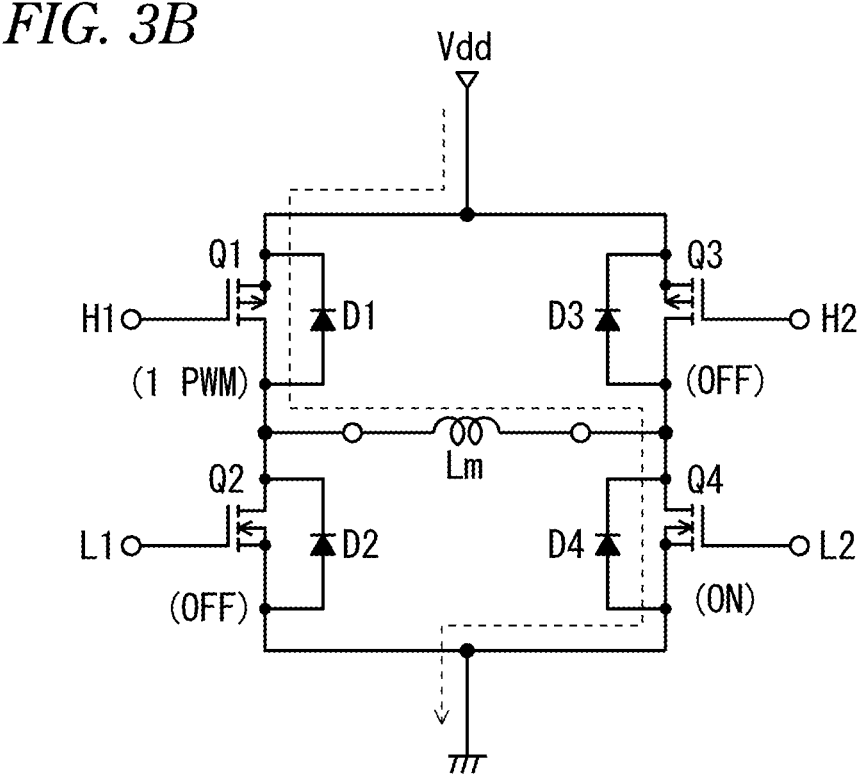

FIG. 3B is the diagram showing the current path during the PWM control period (second period).

During the PWM control period, the switching element Q1 is only once subjected to PWM control with a predetermined on-duty. In this respect, once means that the number of the PWM pulse is one. However, the number of the PWM control is not limited thereto and may be a predetermined number of times of at least one. The switching element Q4 is turned on. Each of the switching elements Q2, Q3 is turned off. The predetermined on-duty means a rate of on period with respect to one period of the PWM signal.

The coil current IL can be reduced gradually at a desired changing rate by adjusting the on-duty of the PWM signal during the PWM control period. The number (predetermined number of times) of the pulses for the PWM control is set to a suitable value based on the specification of the motor.

Like the first period, current shown by a dotted line flows from the DC power source Vdd to the ground via the switching element Q1, the motor coil Lm and the switching element Q4.

Figure 4:
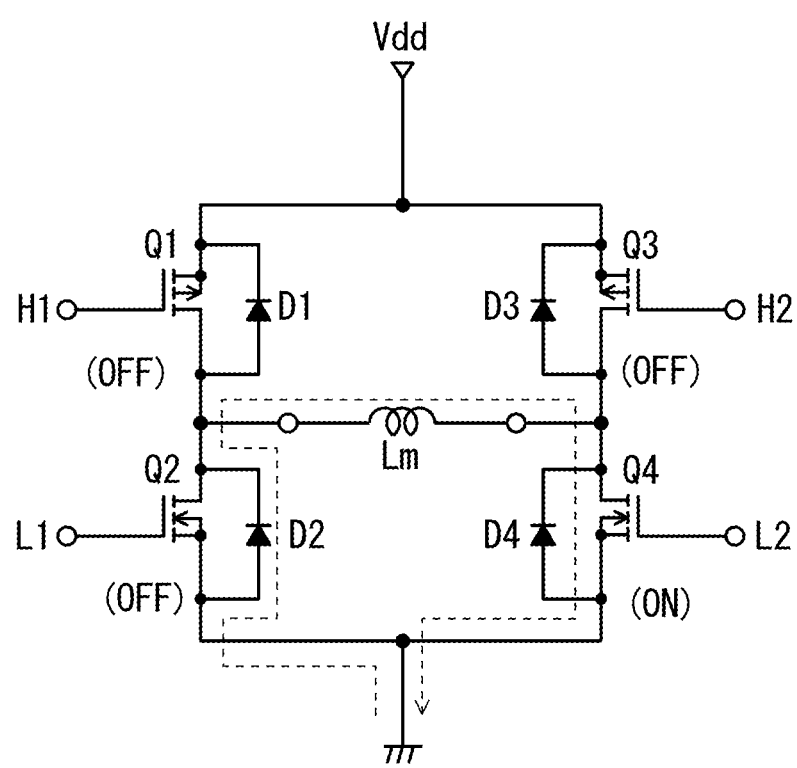
FIG. 4 is a diagram showing a current path during a regeneration control period.

FIG. 4 is a diagram showing the current path during the regeneration control period (see FIG. 2).

During the regeneration control period, the switching element Q1 is turned off. Each of the switching elements Q2, Q3 continues to be in the off state. The switching element Q4 continues to be in the on state.

Current shown by a dotted line flows from the parasitic diode D2 of the switching element Q2 to the switching element Q4 direction via the motor coil Lm to thereby perform regeneration.

Figure 5A:
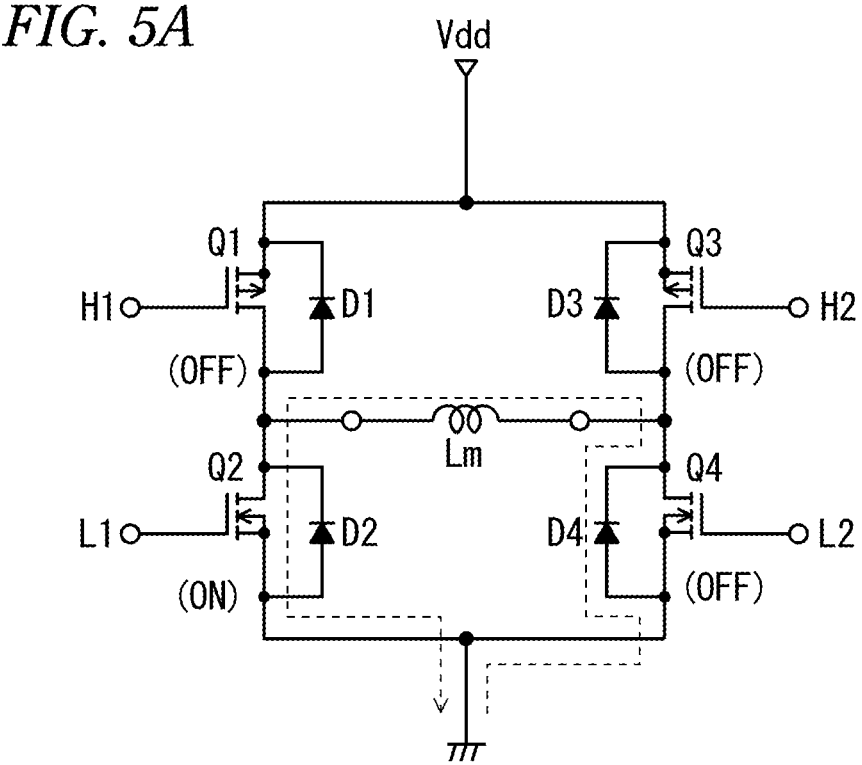
FIGS. 5A-B are diagrams showing current paths during a first kickback suppression period and a second kickback suppression period.

FIGS. 5A and B are diagrams showing the current paths in the first kickback suppression period and the second kickback suppression period, respectively.

FIG. 5A is the diagram showing the current path during the first kickback suppression period (see FIG. 2).

During the first kickback suppression period, the switching element Q2 is turned on. The switching element Q4 is turned off. Each of the switching elements Q1, Q3 continues to be in the off state.

Current shown by a dotted line flows from the parasitic diode D4 of the switching element Q4 to the switching element Q2 direction via the motor coil Lm to thereby perform regeneration. The coil current IL is kept at zero.

In this embodiment, the first kickback suppression period is not enough for the regeneration of the energy accumulated in the motor coil Lm. Thus, the transition is made to the second kickback suppression period explained below.

Figure 5B:
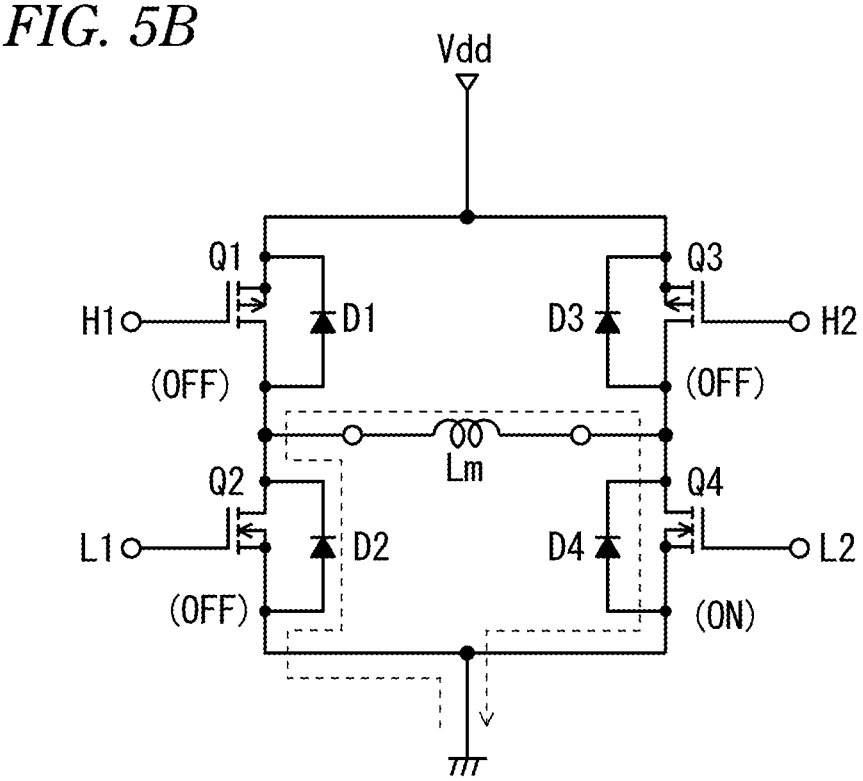

FIG. 5B is the diagram showing the current path during the second kickback suppression period (see FIG. 2).

During the second kickback suppression period, the switching element Q2 is turned off. The switching element Q4 is turned on. Each of the switching elements Q1, Q3 continues to be in the off state.

Current shown by a dotted line flows from the parasitic diode D2 of the switching element Q2 to the switching element Q4 direction via the motor coil Lm to thereby perform regeneration. The coil current IL is kept at zero.

During the kickback suppression period, this transition from the first kickback suppression energization pattern to the second kickback suppression energization pattern is performed for a predetermined number of times. This predetermined number of times occurs at least once and is determined according to the magnitude of energy accumulated in the motor coil Lm.

At the time of switching from the first kickback suppression period to the second kickback suppression period, there is a moment when all-phases of the switching elements Q1 to Q4 are in the off state. In this case, the energy of the motor coil Lm having not been regenerated may be regenerated to the DC power source Vdd side as a negative current. However, thereafter since the switching element Q4 is turned on, the regeneration is switched to the ground side. Thus, the peak of the negative current to be regenerated to the DC power source Vdd side can be suppressed to a degree that is negligible.

At the time of switching from the second kickback suppression period to the first kickback suppression period, there is also a short moment that the energy of the motor coil Lm may be regenerated to the DC power source Vdd side as a negative current. However, the regeneration of the coil energy to the DC power source Vdd side is instantaneous and intermittent. Thus, the energy regeneration is performed gradually at every switching of the kickback suppression period. As a consequence, the peak of the regeneration current (negative current) to the DC power source Vdd side can be suppressed.

In this manner, according to the motor driving control method of the embodiment, since the first and second kickback suppression periods are alternatively switched, the energy regeneration to the DC power source Vdd side can be performed as well as the energy regeneration to the ground side. Thus due to the synergistic effect of energy regeneration, more energy can be regenerated as compared with the case where only the energy regeneration (kickback regeneration) to the one side, that is, the ground side is performed during the same period as the synergistic energy regeneration technique. Accordingly, the energy can be regenerated efficiently.

In the present embodiment, under the restriction of the energization timing during the phase switching, the energy regeneration can be performed quickly and efficiently during a limited period by the switching operation of the kickback suppression periods.

Figure 6A:
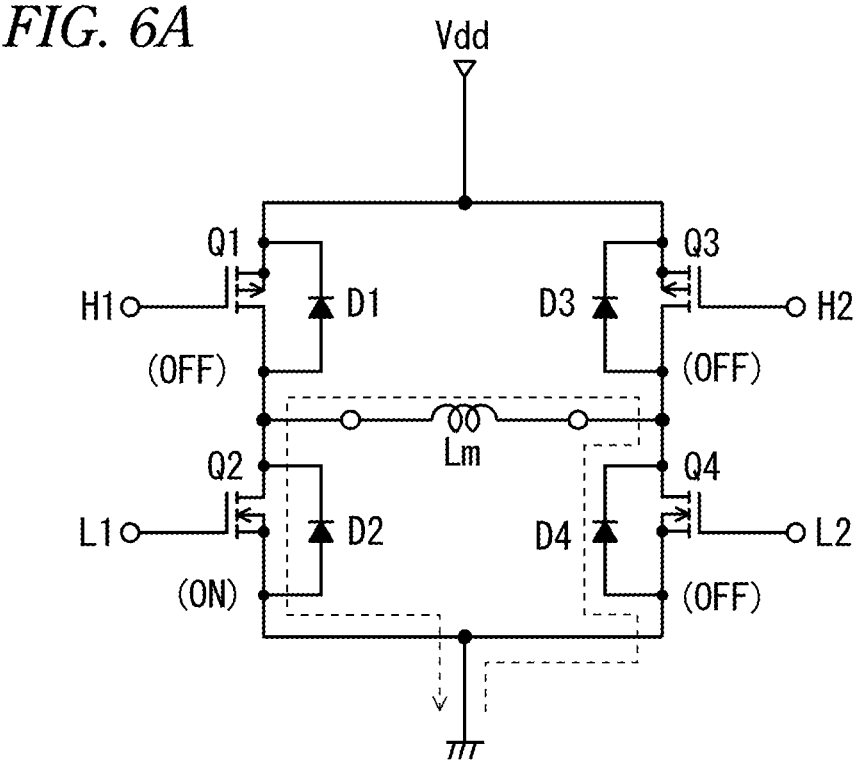
FIG. 6A-B are diagrams showing current paths during a short-circuit prevention control period and a second energization control period.

FIG. 6A and B are diagrams showing the current paths during the short-circuit prevention control period and the second energization control period, respectively.

FIG. 6A is the diagram showing the current path during the short-circuit prevention control period (see FIG. 2).

During the short-circuit prevention control period, the switching element Q2 is turned on. The switching element Q4 is turned off. Each of the switching elements Q1, Q3 is turned off. This short-circuit prevention control period is about several seconds, for example.

Current shown by a dotted line flows from the parasitic diode D4 of the switching element Q4 to the switching element Q2 via the motor coil Lm. The coil current IL gradually reduces from zero to a minus value. According to one aspect of the embodiment, of the short-circuit prevention control period, the generation of a short-circuit state due to the simultaneous turning-on of the switching element Q2 and the switching element Q4 can be prevented. In this respect, in a case that the switching speed of each of the switching elements Q1 to Q4 is fast and hence it can be specified that short-circuit does not occur, this short-circuit prevention control period can be eliminated. Thus, this short-circuit prevention control period is not an essential period.

Figure 6B:
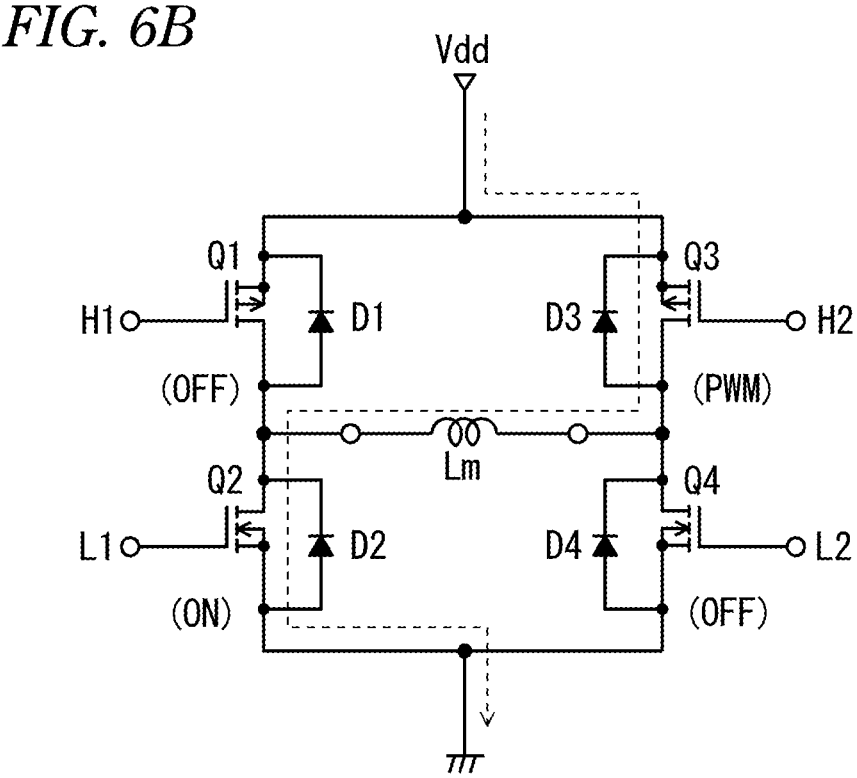

FIG. 6B is the diagram showing the current path in the second energization control period (see FIG. 2).

During the second energization control period, the switching element Q2 is turned on. The switching element Q3 is subjected to PWM control. Each of the switching elements Q1, Q4 is turned off.

Current shown by a dotted line flows from the power source to the ground via the switching element Q3, the motor coil Lm and the switching element Q2. In this case, the coil current IL gradually reduces and reaches a current value (−Ia). Incidentally, the switching element Q3 may not be subjected to PWM control but may be placed in an on state.

FIG. 7 is a timing chart showing waveforms of the respective drive signals and waveforms of the output signals in this embodiment. This timing chart shows the position detection signal Sp, the drive signals H1, L1, H2, L2 and the output signals M1, M2. The output signal M1 is a signal at the first end of the motor coil Lm (see FIG. 1). The output signal M2 is a signal at the second end of the motor coil Lm (see FIG. 1). Each of the drive signals H1, H2 is an active low signal.

During the first energization control period, the position detection signal Sp is at an L level.

The drive signal H1 alternately repeats an H level and the L level to thereby perform PWM control on the switching element Q1. The drive signal L1 is at the L level to thereby turn the switching element Q2 off. The drive signal H2 is at the H level to thereby turn the switching element Q3 off. The drive signal L2 is at the H level to thereby turn the switching element Q4 on.

In this case, the output signal M1 is obtained by inverting the voltage of the drive signal H1. The output signal M2 is at the L level. During the first energization control period, when it is detected that the position detection signal Sp changes to the on state, the motor driving control device 1 transitions to the PWM control period. This transition is performed at a time point t1.

After the PWM control period, the position detection signal Sp is switched to the H level and maintained at the H level, so the position detection signal Sp is maintained to be in the on state.

During the PWM control period, the drive signal H1 alternately repeats the H level and the L level for a predetermined number of times with a predetermined off-duty to thereby perform PWM control on the switching element Q1. The drive signal L1 is at the L level to thereby turn the switching element Q2 off. The drive signal H2 is at the H level to thereby turn the switching element Q3 off. The drive signal L2 is at the H level to thereby turn the switching element Q4 on.

The drive signal H1 performs PWM control on the switching element Q1 by switching to the H level, during which the switching element Q1 is turned to off-state, and to the L level, during which the switching element Q1 is turned to on-state. For example, this H level period is 10µ seconds and the L level period is 1µ second. Under this condition, the switching element Q1 is turned off and on with the predetermined duty. The drive signal L1 is at the L level to thereby turn the switching element Q2 off. The drive signal H2 is at the H level to thereby turn the switching element Q3 off. The drive signal L2 is at the H level to thereby turn the switching element Q4 on.

In this case, the output signal M1 is obtained by inverting the voltage of the drive signal H1. The output signal M2 is at the L level. During the PWM control period, when the predetermined number of the PWM control pulses are output, the motor driving control device 1 transits to the regeneration control period. This transition is performed at a time point t2.

During the PWM control period, the accumulated energy of the motor coil Lm can also be reduced gradually by starting the PWM control of the switching element Q1 with an on-duty smaller than the on-duty of the first energization control period and gradually reducing the on-duty each time the control pulses occur during the PWM control period.

During the regeneration control period, the drive signal H1 is at the H level to thereby turn the switching element Q1 off. The drive signal L1 is at the L level to thereby turn the switching element Q2 off. The drive signal H2 is at the H level to thereby turn the switching element Q3 off. The drive signal L2 is at the H level to thereby turn the switching element Q4 on.

In this case, the output signal M1 is at the H level initially and then becomes the H level after the lapse of a certain time. The output signal M2 is at the L level. This regeneration control period is about several tens of millisecond, for example. Thereafter, the motor driving control device 1 transits to the kickback suppression period. This transition is performed at a time point t3.

During the kickback suppression period, the drive signal H1 is at the H level to thereby turn the switching element Q1 off. The drive signal L1 is initially at the H level to thereby turn the switching element Q2 on and thereafter becomes the L level to thereby turn the switching element Q2 off. The drive signal L1 alternately repeats the H level and the L level for a predetermined number of times. The drive signal H2 is at the H level to thereby turn the switching element Q3 off. The drive signal L2 is initially at the L level to thereby turn the switching element Q4 off and thereafter becomes the H level to thereby turn the switching element Q4 on. The drive signal L2 alternately repeats the H level and the L level for a predetermined number of times. Thereafter, the motor driving control device 1 transits to the short-circuit prevention control period. This transition is performed at a time point t4.

During the short-circuit prevention control period, the drive signal H1 is at the H level to thereby turn the switching element Q1 off. The drive signal L1 is at the H level to thereby turn the switching element Q2 on. The drive signal H2 is at the H level to thereby turn the switching element Q3 off. The drive signal L2 is at the L level to thereby turn the switching element Q4 off. In this period, each of the output signals M1, M2 is at the L level.

Thereafter, the motor driving control device 1 transits to the second energization control period. This transition is performed at a time point t5.

During the second energization control period, the position detection signal Sp is at the H level.

The drive signal H1 is at the H level to thereby turn the switching element Q1 off. The drive signal L1 is at the H level to thereby turn the switching element Q2 on. The drive signal H2 alternately repeats the L level and the H level to thereby perform PWM control on the switching element Q3. The drive signal L2 is at the L level to thereby turn the switching element Q4 off.

In this period, the output signal M1 is at the L level. The output signal M2 is obtained by inverting the voltage of the drive signal H2.

This second energization control period is continued until the motor driving control device 1 detects the off state of the position detection signal Sp.

Figure 8:
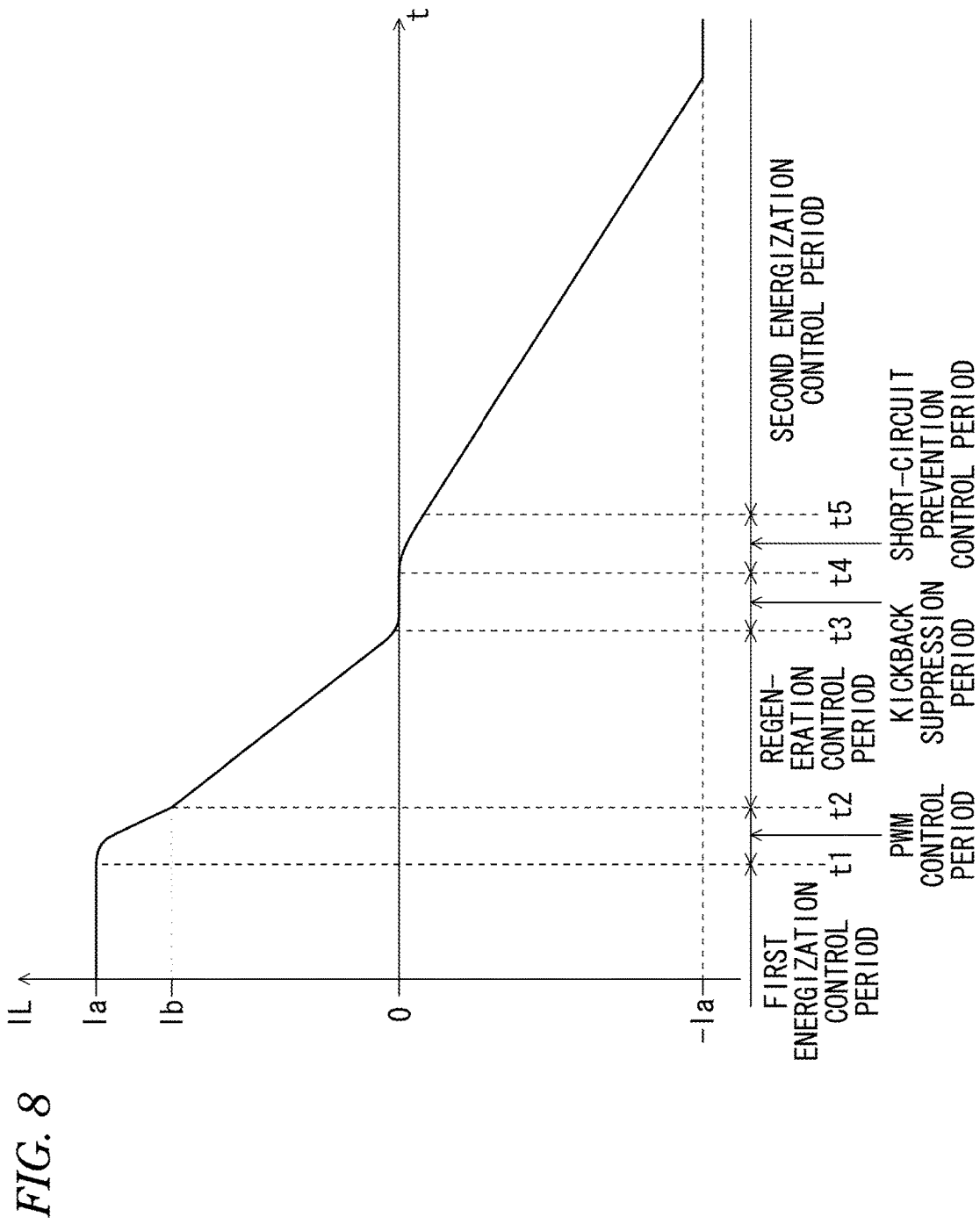
FIG. 8 is a graph showing the change of coil current in the embodiment.

FIG. 8 is a graph showing the change of the coil current IL in this embodiment. In this graph, an vertical axis represents a current value and an horizontal axis represents the time.

In the first energization control period, the coil current IL maintains the current value Ia.

In the PWM control period from the time point t1 to the time point t2, the coil current IL reduces from the current value Ia to a current value Ib.

In the regeneration control period from the time point t2 to the time point t3, the coil current IL reduces gradually from the current value Ib to 0 A.

In the kickback suppression period from the time point t3 to the time point t4, the coil current IL maintains 0 A.

In the short-circuit prevention control period from the time point t4 to the time point t5, the coil current IL reduces gradually and reaches a negative current value.

In the second energization control period on and after the time point t5, the coil current IL reduces gradually, then reaches the negative current value (−Ia) and thereafter maintains this negative current value (−Ia).

In this manner, according to the control method of this embodiment, the kickback suppression period is provided at the time of switching the energization. Thus, after the energy accumulated in the motor coil Lm is released sufficiently, the direction of flow of the coil current IL flowing through the motor coil Lm is switched. As a consequence, a regenerative current flowing through a power source line can be suppressed. Accordingly, the control method of this embodiment can suppress the generation of the inductive kickback and hence suppress the vibration of the motor and noise.

Figure 9:
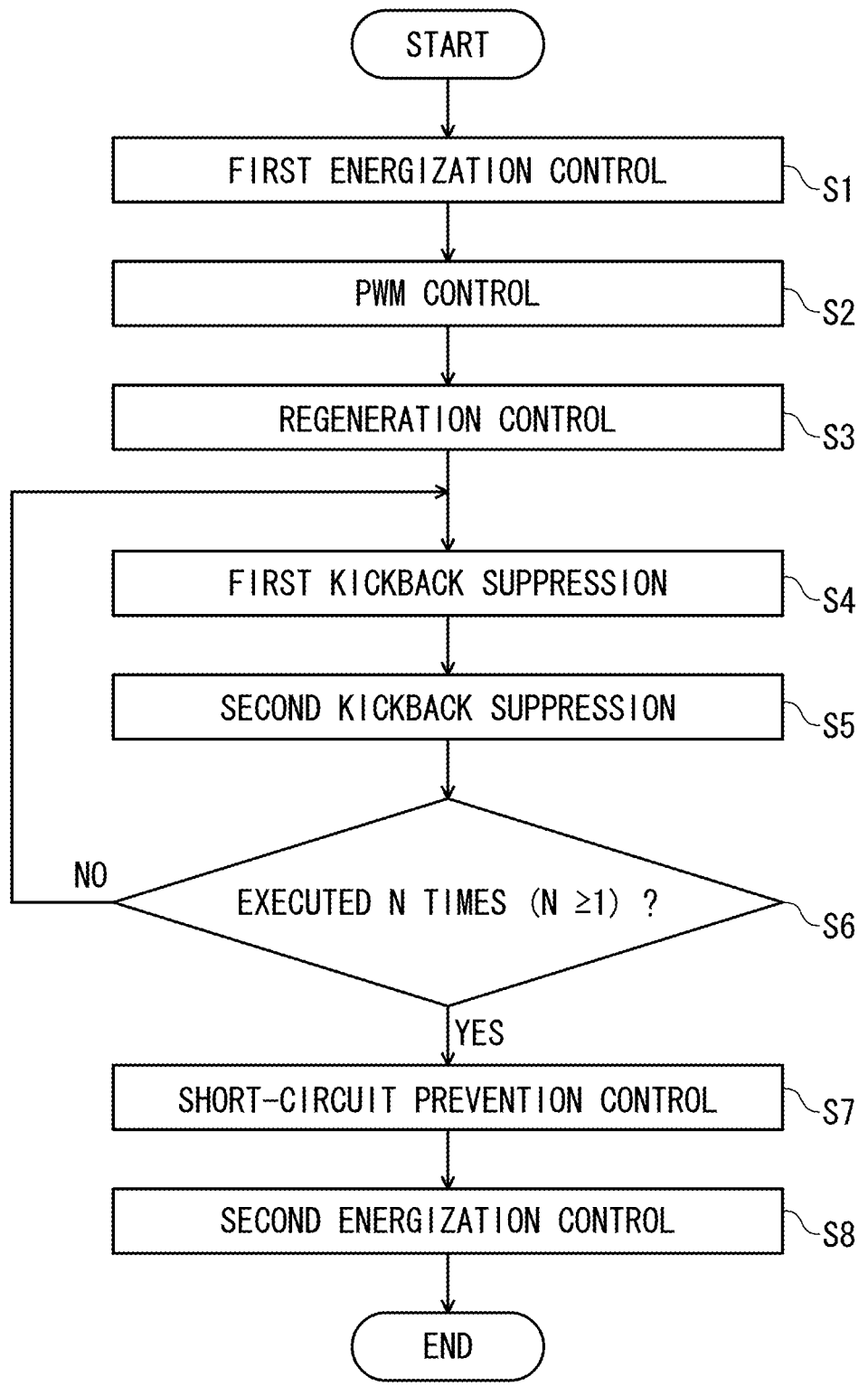
FIG. 9 is a flowchart showing the motor control method of the embodiment.
Figure 10:
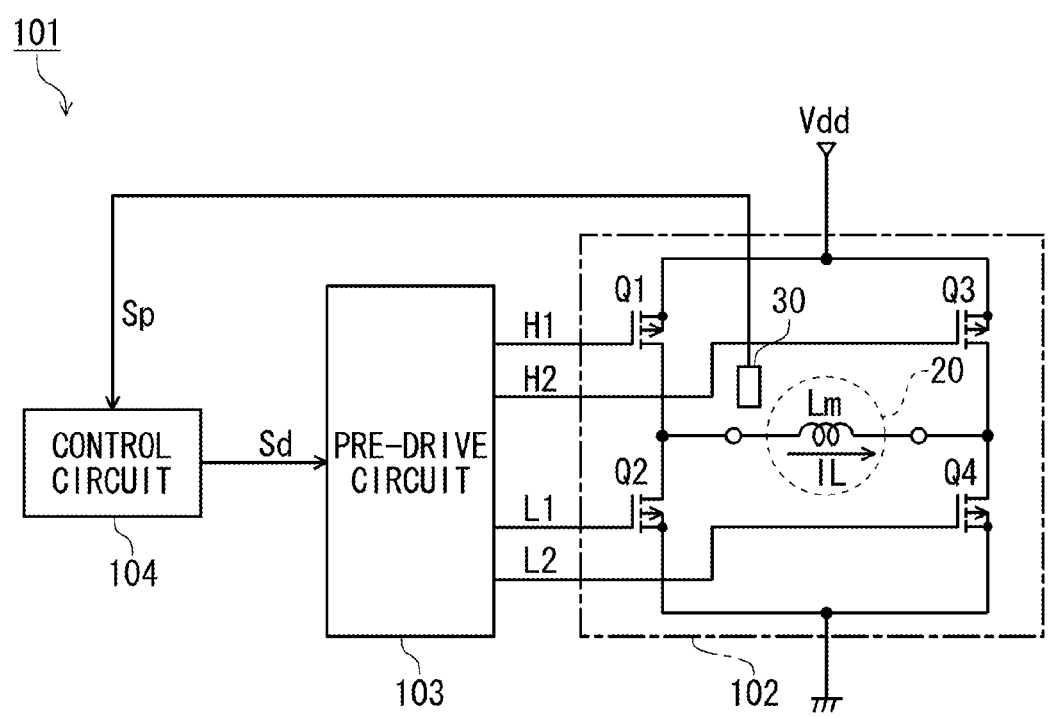
FIG. 10 is a schematic diagram showing the configuration of a motor driving control device of a comparative example.
Figure 12:
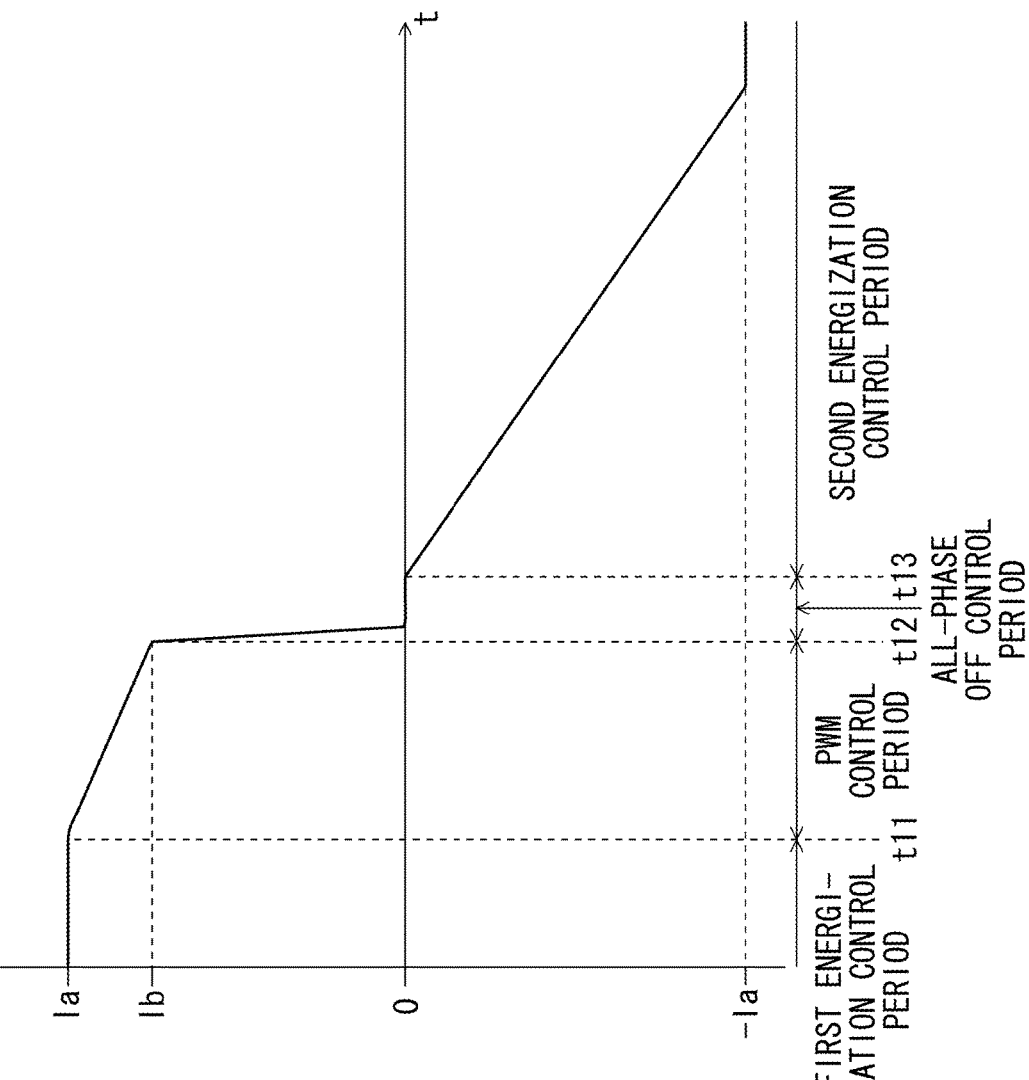
FIG. 12 is a graph showing the change of coil current of the comparative example.

FIG. 9 is a flowchart showing the motor control method of this embodiment. The control circuit 4 executes the following energization control step at the time of transition from the first energization control period to the second energization control period.

In a step S1, the control circuit 4 executes the processing of a first energization control step. In the first energization control step, each of the switching elements Q2, Q3 is turned off, the switching element Q1 is subjected to PWM control and the switching element Q4 is turned on. Thereafter, the control circuit 4 executes the processing of a step S2 based on the position detection signal Sp.

In step S2, the control circuit 4 performs PWM control on the switching element Q1 with the predetermined on-duty to thereby execute the processing of a PWM control step. Then, upon the lapse of a predetermined time, the control circuit 4 executes the processing of a step S3.

In step S3, the control circuit 4 turns the switching element Q1 off to thereby execute the processing of a regeneration control step. Then, upon the lapse of a predetermined time, the control circuit 4 executes the processing of a step S4.

In step S4, the control circuit 4 turns the switching element Q2 on and turns the switching element Q4 off to thereby execute the processing of a first kickback suppression step. Then, upon the lapse of a predetermined time, the control circuit 4 executes the processing of a step S5.

In step S5, the control circuit 4 turns the switching element Q2 off and turns the switching element Q4 on to thereby execute the processing of a second kickback suppression step. Then, upon the lapse of a predetermined time, the control circuit 4 executes the processing of a step S6.

In step S6, the control circuit 4 determines whether or not each of the first and second kickback suppression steps is executed for a predetermined number of times N. When it is determined that each of the first and second kickback suppression steps is executed for the N times (YES), the control circuit 4 executes the processing of a step S7. In contrast, when it is determined that each of the first and second kickback suppression steps has not been executed for the N times yet (NO), the processing returns to the step S4. In this respect, N is an integer of one or more.

In step S7, the control circuit 4 turns the switching element Q2 on and turns the switching element Q4 off to thereby execute the processing of a short-circuit prevention control step. Then, upon the lapse of a predetermined time, the control circuit 4 executes the processing of a step S8.

In the step S8, the control circuit 4 turns the switching element Q2 on and performs PWM control on the switching element Q3 to thereby execute the processing of a second energization control step. Thereafter, the control circuit 4 completes the processing of FIG. 9.

According to the motor control method of this embodiment, even when the coil current is not regenerated sufficiently in the regeneration control step, the energy accumulated in the motor coil can be effectively released by the kickback suppression step. Thus, the motor control method of this embodiment can suitably suppress the generation of the inductive kickback and hence suppress the vibration of the motor 20 and noise.

According to the motor control method of this embodiment, the repetition number N of the transition from the first kickback suppression period to the second kickback suppression period can be adjusted. Thus, this method can be broadly applied with respect to the motor specification by adjusting the repetition number N according to the magnitude of energy accumulated in the motor coil Lm. In this manner, the motor control method of this embodiment can suitably suppress the generation of the inductive kickback and hence suppress the vibration of the motor and noise.

The present invention is not limited to the aforesaid embodiment and can be changed within a range not departing from the gist of the present invention. For example, the invention may be modified in the following manners (a) to (i).

(a) In the respective constituent elements of the motor driving control device 1, at least part thereof may not be realized by the processing of hardware but may be realized by the processing of software.

(b) At least a part of the motor driving control device 1 may be configured by an integrated circuit (IC).

(c) The motor 20 is not limited to the brushless motor and may be any type of motor.

(d) The position detection method is not limited to the method using the Hall element but may be a method employing a pattern FG (Frequency Generator) using a coil pattern provided on a circuit board or a method employing rotation speed information according to the detection of counter electromotive force.

(e) The waveforms of the respective signals shown in FIG. 7 are one example and not limited thereto.

(f) The graph of the coil current IL shown in FIG. 8 is one example and not limited thereto.

(g) The flowchart shown in FIG. 9 is one example and not limited thereto. For example, other processing may be executed between the respective steps.

(h) According to the invention, each of the switching elements Q1, Q3 of an upper arm is subjected to PWM control or controlled so as to be in the on state during the first and second energization control periods, and then the regeneration signal and the kickback current are routed to flow through the switching elements Q2, Q4 of an lower arm during the succeeding regeneration control period etc. However the invention is not limited thereto and may be arranged in a manner that each of the switching elements of the lower arm is controlled so as to be in the on state or subjected to PWM control during the first and second energization control periods, and then the regeneration signal and the kickback current are routed to flow through the switching elements of the upper arm during the succeeding regeneration control period etc.

(i) The H-bridge circuit 2 may be configured in a manner that the one end of each of the switching elements Q2, Q4 is connected to the DC power source Vdd and the other ends of the switching elements Q2, Q4 are respectively connected to the one ends of the switching elements Q1, Q3, and further the other end of each of the switching elements Q1, Q3 is grounded.

What is claimed is:

1. A motor driving control method for controlling rotation of a motor by controlling an H-bridge circuit having:
    a first series circuit that includes first and second switching elements that are connected between a DC power source and a ground;
    a second series circuit that includes third and fourth switching elements, the second series circuit being connected in parallel to the first series circuit; and
    a motor coil of the motor which is connected between a connection node of the first switching element and the second switching element and a connection node of the third switching element and the fourth switching element,
    wherein the method comprising:
    a first step of, during a first energization control period, turning off each of the second and third switching elements, turning on or performing PWM control on the first switching element, and turning on the fourth switching element;
    a second step of, during a PWM control period after the first energization control period, performing PWM control on the first switching element with a predetermined on-duty for a predetermined number of times;
    a third step of, during a regeneration control period after the PWM control period, turning off the first switching element;
    a fourth step of, during a kickback suppression period after the regeneration control period, repeating for a predetermined number of times a first kickback suppression period and a second kickback suppression period, the second switching element being turned on and the fourth switching element being turned off during the first kickback suppression period, and the second switching element being turned off and the fourth switching element being turned on during the second kickback suppression period; and
    a fifth step of, during a second energization control period after the kickback suppression period, turning on the second switching element and turning on or performing PWM control on the third switching element.

2. The method according to claim 1 further comprising a sixth step of, during a short-circuit prevention control period after the second kickback suppression period, turning on the second switching element and turning off the fourth switching element to allow current flow from the fourth switching element to the second switching element side trough the motor coil, wherein the fifth step is performed after performing the sixth step.

3. The method according to claim 1,
wherein the H-bridge circuit has a configuration in which:
each of one end of the first switching element and one end of the third switching element is connected to the DC power source;
the other end of the first switching element is connected to one end of the second switching element;
the other end of the third switching element is connected to one end of the fourth switching element; and
each of the other end of the second switching element and the other end of the fourth switching element is connected to ground.

4. The method according to claim 1,
wherein the H-bridge circuit has a configuration in which:
each of one end of the second switching element and one end of the fourth switching element is connected to the DC power source;
the other end of the second switching element is connected to one end of the first switching element;
the other end of the fourth switching element is connected to one end of the third switching element; and
each of the other end of the first switching element and the other end of the third switching element is connected to ground.

5. A motor driving control device comprising:
an H-bridge circuit comprising:
   a first series circuit that includes first and second switching elements that are connected between a DC power source and a ground;
   a second series circuit that includes third and fourth switching elements, the second series circuit being connected in parallel to the first series circuit; and
   a motor coil of the motor which is connected between a connection node of the first switching element and the second switching element and a connection node of the third switching element and the fourth switching element;
a pre-drive circuit that generates drive signals for driving the first, second, third and fourth switching elements of the H-bridge circuit; and
a control circuit that generates a drive control signal for controlling the drive signals output from the pre-drive circuit,
wherein the control circuit comprises:
an energization pattern generation part that is configured to:
   generate a first energization control pattern for turning off each of the second and third switching elements, turning on or performing PWM control on the first switching element, and turning on the fourth switching element;
   generate, after generating the first energization control pattern, a PWM control pattern for performing PWM control on the first switching element with a predetermined on-duty for a predetermined number of times;
   generate, after generating the PWM control pattern, a regeneration control pattern for turning off the first switching element;
   generate, after generating the regeneration control pattern, a kickback suppression pattern that includes a first kickback suppression pattern for turning on the second switching element and turning off the fourth switching element, a second kickback suppression pattern for turning off the second switching element and turning on the fourth switching element, and information indicating a number of times to repeat the first kickback suppression pattern and the second kickback suppression pattern; and
   generate, after generating the kickback suppression pattern, a second energization control pattern for turning on the second switching element and turning on or performing PWM control on the third switching element; and a motor control part that is configured to generate the drive control signal based on the respective energization patterns generated by the energization pattern generation part and positional information of the motor.

6. The device according to claim 5,
wherein the energization pattern generation part is configured to generate, after generating the kickback suppression energization pattern, a short-circuit prevention control energization pattern for turning on the second switching element and turning off the fourth switching element.

7. The device according to claim 5,
wherein the energization pattern generation part comprises an energization pattern memory part that is configured to store information of the first energization control pattern, information of the PWM control energization pattern, information of the regeneration control energization pattern, information of the kickback suppression energization pattern, and information of the second energization control pattern.

8. A motor driving control method for controlling rotation of a motor by controlling an H-bridge circuit having:
   a first series circuit that includes first and second switching elements that are connected between a DC power source and a ground;
   a second series circuit that includes third and fourth switching elements, the second series circuit being connected in parallel to the first series circuit; and
   a motor coil of the motor which is connected between a connection node of the first switching element and the second switching element and a connection node of the third switching element and the fourth switching element,
wherein the method comprising:
turning off each of the second and third switching elements, turning on or performing PWM control on the first switching element, and turning on the fourth switching element during a first energization control period;
performing PWM control on the first switching element with a predetermined on-duty for a predetermined number of times during a PWM control period after the first energization control period;
turning off the first switching element during a regeneration control period after the PWM control period;
repeating for a predetermined number of times a first kickback suppression step and a second kickback suppression step during a kickback suppression period after the regeneration control period, the second switching element being turned on and the fourth switching element being turned off in the first kickback suppression step, and the second switching element being turned off and the fourth switching element being turned on in the second kickback suppression step; and
turning on the second switching element and turning on or performing PWM control on the third switching element during a second energization control period after the kickback suppression period.

9. The method according to claim 8 further comprising:

turning on the second switching element and turning off the fourth switching element to allow current flow from the fourth switching element to the second switching element side through the motor coil during a short-circuit prevention control period after the second kickback suppression period, wherein the control for the second energization control period if performed after the control for the short-circuit prevention control period.

10. The method according to claim 8, wherein the H-bridge circuit has a configuration in which:

each of one end of the first switching element and one end of the third switching element is connected to the DC power source;

the other end of the first switching element is connected to one end of the second switching element;

the other end of the third switching element is connected to one end of the fourth switching element; and each of the other end of the second switching element and the other end of the fourth switching element is connected to ground.

11. The method according to claim 8, wherein the H-bridge circuit has a configuration in which:

each of one end of the second switching element and one end of the fourth switching element is connected to the DC power source;

the other end of the second switching element is connected to one end of the first switching element;

the other end of the fourth switching element is connected to one end of the third switching element; and each of the other end of the first switching element and the other end of the third switching element is connected to ground.

\* \* \* \* \*